US009319267B1

(12) United States Patent
Buchko et al.

(10) Patent No.: US 9,319,267 B1
(45) Date of Patent: Apr. 19, 2016

(54) REPLICATION IN ASSURED MESSAGING SYSTEM (71) Applicant: Solace Systems, Inc., Kanata (CA)

(72) Inventors: Steve Buchko, Dunrobin (CA); Shawn McAllister, Manotick (CA); Duane Raymond Pauls, Stittsville (CA); David W. Horton, Ottawa (CA); Daniel Adamski, Nepean (CA)

(73) Assignee: SOLACE SYSTEMS, INC., Kanata, ON (CA)

( * ) Notice: Subject to any disclaimer, the term of this patent is extended or adjusted under 35 U.S.C. 154(b) by 224 days.

(21) Appl. No.: 13/645,190

(22) Filed: Oct. 4, 2012

(51) Int. Cl.
*G06F 15/16* (2006.01)
*H04L 12/24* (2006.01)
*H04L 12/707* (2013.01)
*H04L 12/703* (2013.01)
*H04L 29/14* (2006.01)
*H04L 12/70* (2013.01)

(52) U.S. Cl.
CPC ............ *H04L 41/0668* (2013.01); *H04L 45/22* (2013.01); *H04L 45/28* (2013.01); *H04L 69/40* (2013.01); *H04L 2012/5627* (2013.01)

(58) Field of Classification Search
CPC ..... H04L 41/0668; H04L 45/22; H04L 45/28; H04L 69/40; H04L 2012/5627; G06F 11/2048
USPC ......... 709/203, 204, 206, 217, 220, 223, 224, 709/235, 239; 711/162; 714/4.11
See application file for complete search history.

(56) References Cited

U.S. PATENT DOCUMENTS

| | | | | |
|---|---|---|---|---|
| 5,996,001 A * | 11/1999 | Quarles et al. | ................ | 709/203 |
| 7,716,525 B1 | 5/2010 | Buchko et al. | | |
| 8,191,078 B1 * | 5/2012 | Cullen et al. | ................... | 719/315 |
| 2004/0103342 A1 * | 5/2004 | Moser et al. | ...................... | 714/6 |
| 2004/0158766 A1 * | 8/2004 | Liccione et al. | ................... | 714/4 |
| 2005/0228867 A1 * | 10/2005 | Osborne et al. | ............... | 709/206 |
| 2006/0179147 A1 * | 8/2006 | Tran et al. | ...................... | 709/227 |
| 2006/0248373 A1 * | 11/2006 | Warman et al. | ................... | 714/4 |
| 2009/0006564 A1 * | 1/2009 | Kay et al. | ....................... | 709/206 |
| 2010/0235676 A1 * | 9/2010 | Aboel-Nil et al. | ................ | 714/4 |
| 2011/0060939 A1 * | 3/2011 | Singhal et al. | ................. | 714/4.3 |
| 2012/0102355 A1 * | 4/2012 | Krishnaprasad et al. | ..... | 714/4.11 |
| 2012/0303999 A1 * | 11/2012 | Calder et al. | ................... | 714/6.3 |
| 2014/0089425 A1 * | 3/2014 | Chin et al. | ...................... | 709/206 |

* cited by examiner

*Primary Examiner* — Liangche A Wang
*Assistant Examiner* — Johnny Aguiar
(74) *Attorney, Agent, or Firm* — Marks & Clerk; Richard J. Mitchell (57) ABSTRACT

An assured message delivery system with resiliency receives messages from publishing client(s) and delivers them to subscribing clients. A primary system delivers the messages during normal operation. A secondary system mirroring the configuration of the primary system takes over responsibility for delivering the messages in the event of failure of the primary system. The secondary system is connected to the primary system over a communications link. The primary system sends copies of the messages to the secondary system over the communications link. The secondary system stores replicate messages and sends acknowledgement messages back to the primary system.

4 Claims, 6 Drawing Sheets

REPLICATION IN ASSURED MESSAGING SYSTEM

FIELD OF THE INVENTION

This invention relates to data communication networks and in particular to a method of providing message replication as a feature of an assured message delivery system.

BACKGROUND OF THE INVENTION

In the prior art, many message delivery systems exist which offer assured message delivery between endpoints, such as between different applications. Assured message delivery is also known in the art as persistent, guaranteed or durable messaging. An exemplary implementation of an assured messaging system is detailed in U.S. Pat. No. 7,716,525 (Buchko) the contents of which are herein included by reference.

Many of the applications that make use of assured message delivery systems are mission-critical in nature and in some cases are critical to business continuity. Prior art assured message delivery systems often include redundancy as a feature such that they can recover quickly from component failure; in applications that are critical to business continuity component level redundancy may not provide sufficient protection. In these cases the required level of system availability can only be achieved by replicating the messages and transferring them to another system possibly in another location. Redundancy provided by message replication is distinguished from component redundancy by the location of the redundant equipment and the failover mechanisms. In a replication deployment the secondary infrastructure would typically be in a separate building. Component level redundancy schemes typically feature automatic failover to minimize the duration of the outage, in these situations the systems detect the failure and switch over to the redundant system without any intervention from the network operator. In the case of replication, the decision to switch to the secondary site is most often made by network operators.

Prior art assured messaging systems typically use disk and disk based file systems as a non-volatile store of message data and related state. The disk store is typically located in a separate system and connected by a storage area network (SAN). Disk storage equipment from EMC Corporation supports a feature called Symetrix Remote Data Facility (SRDF) and other manufacturers support similar features where data stored to disk is synchronously or asynchronously mirrored to a disk located in a remote site using wide area networking technologies (typically TCP/IP combined with iSCSI). Assured messaging systems that make use of disk storage are able to use features such as SRDF to implement replication. In such an implementation message data and state replicated by the disk system can be recovered by a secondary system which is able to resume operation in the case of a service interruption in the primary infrastructure. Systems implemented in this way suffer from a few undesirable characteristics. They are slow to become active after a switch and the necessity to write to disk affects normal run time performance. These systems are slow to recover replicated messages and state because they are unable to maintain state in real time. Disk based file systems are not generally multi access, meaning that only one system can have access to the data stored on the disk at a time. The practical limitation to the assured messaging system that relies on mirroring a disk based file system to a remote site as a persistent store is that the system in the secondary site cannot have access to the file system stored on the disk until it is determined that the replicated messages must be recovered. At this point the secondary system must mount the mirrored copy of the file system and rebuild all state from data stored on the disk; this operation could take from several minutes to hours to complete.

The properties of disk based file systems also affect the real time performance of the assured messaging system, as described by Buchko. In particular the latency associated with accessing disks is amplified if the disk writes must be synchronously mirrored to a remote site. By the nature of how the previously discussed disk mirroring features work, even if a single user of the messaging system required synchronous mirroring of data to a remote disaster recovery site then all users of the assured messaging system would suffer the additional performance penalty.

The primary use of replication in message delivery systems is to aid in the implementation of redundancy. Current replication implementations that rely on features of disk systems to mirror persistent data to a secondary system suffer from a number of limitations. It would be desirable to have a replication implementation with the following characteristics: synchronous and asynchronous assured message delivery without the need to involve disk based storage, isolation of users such that user(s) that do not require replication are not affected by those that do and real time update of message delivery state in secondary system to facilitate fast resumption of activity after a switch has been effected.

SUMMARY OF THE INVENTION

According to the present invention there is provided an assured message delivery system with resiliency for receiving messages from publishing client(s) and delivering them to subscribing clients, comprising a primary system for delivering the messages during normal operation; and a secondary system mirroring the configuration of the primary system for taking over responsibility for delivering the messages in the event of failure of the primary system, said secondary system being connected to the primary system over a communications link; and wherein the primary system is configured to send copies of the messages to the secondary system over the communications link; and the secondary system is configured to store replicate messages and send acknowledgement messages back to the primary system upon receipt of the replicate messages.

This system allows the secondary system to take over seamlessly in the event of failure of the primary system with minimal latency since to the clients the secondary system already has the same credentials as the primary system without the need to download state information from storage.

Embodiments of the invention thus provide:
1) A system in which a single instance can support a mix of synchronous, asynchronous and non-replicated traffic where the presence of replicated traffic has no effect on the performance of non-replicated traffic.
2) A system that maintains a hot state in the secondary site so a switch can be effected mush faster.

According to another aspect of the invention there is provided a method of providing resiliency in an assured message delivery system for receiving messages from publishing client(s) and delivering them to subscribing clients, comprising provisioning a primary system to deliver the messages during normal operation; provisioning a secondary system to mirror the configuration of the primary system; sending copies of the messages from the primary system to the secondary system; storing replicate messages at the secondary system, the secondary system sending acknowledgement messages back to the primary system when it has stored the replicate messages, and wherein the secondary system takes over responsibility for delivering the messages in the event of failure of the primary system.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

Figure 1:
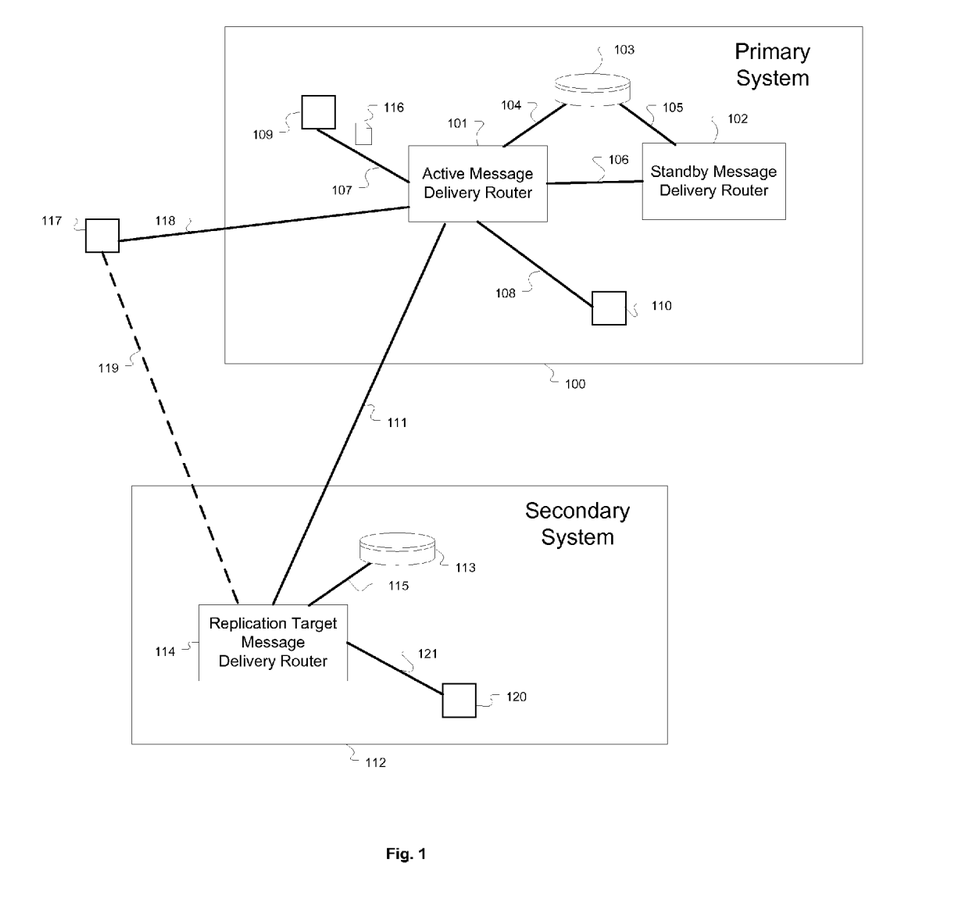
FIG. 1 shows an example message network providing assured message delivery service with replication.

FIG. 1 shows a single node of a message delivery system. Many such nodes may be combined as described by Buchko to create a larger message delivery network. The node depicted in FIG. 1 consists of two message delivery routers 101, 102 that form the primary system 100 and a replication target message delivery router 114 acting as a secondary system 112. Two message delivery routers 101, 102 form the primary system 100 to provide redundancy with automatic failover in the event that there is a component failure of the active message delivery router 101. Other node topologies are possible within the scope of the present invention for example the secondary system 112 could optionally contain two message delivery routers in an active, standby pair similar to the primary system 100 if an even higher level of resiliency is required. Similarly it is also possible that the primary system 100 could contain a single message delivery router. It is also important to note that a message delivery router 101, 102, 114 may be virtualized such that a single device may act in more than one logical capacity known in the art as a message virtual private network or VPN. A message delivery router may act in one VPN instance as a primary system while simultaneously acting as a secondary system in a second VPN. The present invention details a method of replicating messages between two systems; the topology of the two systems is immaterial. Replication may be used to implement a redundancy scheme in which case it may be desirable to house the replication target message delivery router 114 in a physically separate location from the primary system 100 however there is no requirement for a second location and techniques detailed could be equally applied to systems that are collocated. As previously stated the primary system 100 is not required to be a locally redundant pair by the present invention. The locally redundant message delivery routers 101, 102 also each have a connection 104, 105 to a shared storage 103. The links 104, 105 could be implemented using a standard storage area networking technology such as fibre channel, iSCSI, SAS or other. The shared storage 103 is typically implemented as an array of individual storage elements such as hard drives or Solid State Disks (SSD) and is available in the market place from multiple vendors. As an alternative implementation the shared storage 103 may consist of individual storage elements located within the message delivery routers 101, 102 and mirrored using a standard networking technology or the mate link 106. The shared storage 103 is a used as a non-volatile store for data that is accessible by both active and standby message delivery routers 101 and 102. Shared storage 103 may be used to store excess data that exceeds the capacity of local non-volatile storage of the message delivery router 101, 102 using techniques described by Buchko.

FIG. 1 also shows clients 109, 110 of the messaging system. Client 109 is shown as a message publishing or producing client and client 110 is shown as a message subscribing or consuming client however, either client 109, 110 could produce, consume or produce and consume messages. The clients 109, 110 are typically applications that are running on general purpose servers but could be any type of device that is capable of communicating with the message delivery router. Message 116 is shown as being created and sent to the message delivery router 101 by client 109 for delivery to a client 110 that has expressed interest in receiving messages (based on some criteria or interest previously communicated to the message delivery router 101) as described by Buchko. The clients 109, 110 communicate with the message delivery router 101 via communication links 107, 108. The communication links 107, 108 as drawn are logical in nature, intended to be based on standard networking technology such as Ethernet, TCP/IP, infiniband or other. In a physical implementation of a system like that shown in FIG. 1 the communication links 107, 108 would most likely be implemented using a series of network switches and routers typically present in a local area network. Not shown are additional logical communication links between the clients 109, 110 and the standby message delivery router 102 that must exist so that the clients 109, 110 are able to communicate with the standby message delivery router 102 in the event of a failure of the active message delivery router 101. As an example, refer to U.S. Pat. No. 7,859,992 ("Router redundancy in data communication networks"), herein incorporated by reference.

The secondary system 112 is comprised of the replication target message delivery router 114 and related equipment such as storage 113, connected to message delivery router 114 via link 115. The storage 113 is an optional component, depending on implementation, as was described for the primary system 100. Note that prior art implementations of assured messaging systems with replication also typically feature a storage element similar to 103 or 113; the implementation of the present invention differs by the fact that the storage system (or SAN) is not the mechanism by which data is transferred between the primary 100 and secondary systems 112. The present invention features a communication link 111 that connects the active message delivery router 101 of the primary system 100 and the replication target message delivery router 114 of the secondary system 112. The communication link 111 could be implemented using any standard networking technology. If the two systems 100, 112 are located in different geographies, communication link 111 should be implemented using a networking technology suited to use in a wide area environment such as TCP/IP. The communication link 111 is a logical connection, in reality the two systems are typically connected by one or more switches, routers, transmission equipment, and physical links. The communication link 111 is used to transport replicate messages 116 and associated state between the active message delivery router 101 of the primary system 100 and the replication target message delivery router 114 of the secondary system 112 in real time by mechanisms to be described in subsequent sections.

As previously described, FIG. 1 shows a typical deployment of an assured message delivery system featuring a primary locally redundant system 100 with additional redundancy provided by the replication target message delivery router 114 of the secondary system 112. Techniques used to implement redundancy such as those described in U.S. Pat. No. 7,859,992 are more suitable to deployments where active and standby systems are connected to the same local area network (LAN). Redundancy schemes implemented using message replication are suitable to environments where the primary 100 and secondary system 112 are connected by a wide area network (WAN) or a LAN. In a local redundancy scheme such as between active message delivery router 101 and standby message delivery router 102 an activity switch to the standby 102 in the event of a failure of the active 101 is often automatic and is effected without intervention from network operators. In the case of redundancy schemes implemented using message replication a switch over to the secondary system 112 usually requires operator intervention and is expected to take longer to effect; however operator intervention is not a requirement and it is possible within the scope of the present invention to implement a system that features automatic failover to the secondary system. In the case of the primary locally redundant system 100 it may be possible using the techniques of U.S. Pat. No. 7,859,992 for clients 109-110 to reconnect to the same address after an activity switch from active 101 to standby 102; when switching from primary system 100 to secondary system 112 the clients will have to re-connect to a different address. For clients that must reconnect to a different address after an activity switch, two example techniques that should be known to those skilled in the art are changing the DNS entry for the message delivery router or simply to have the clients configured to attempt to connect to a different network address if they time out trying to connect to the primary system 100.

Client 117 in FIG. 1 is an example of a client that is not collocated with either the primary 100 or secondary 112 systems. The client 117 could be a server hosted in a separate datacenter, a mobile device or any device that is capable of communicating with the message delivery routers 101, 102, 114. Client 117 communicates with the message delivery routers 101, 102, 114 via communication links 118, 119; as with communication links 107 and 108 these links are logical in nature and would most likely be comprised of a series of switches, routers, transport equipment and associated cables and optical fibers. Communication link 119 is shown as a dashed line indicating that it is not currently active. If there was an activity switch and the secondary system 112 was to become active then client 117 would establish communication to with the replication target message delivery router 114 via communication link 119 using one of the previously described techniques.

The behavior of the secondary system 112 differs from the primary system 100 in a number of ways. Firstly configuration must be mirrored from the primary system 100 to the secondary 112 within the scope in which the secondary 112 is acting as a replication target. This may be done automatically such that when a configuration change is made on the primary 100, it is automatically mirrored to the secondary 112 or may be done manually. The configuration must be mirrored so that clients can connect to the replication target message delivery router 114 with the same credentials used to connect to the primary system 100. A second difference is in the way messages are queued to endpoints on the replication target message delivery router 114. With the configuration mirrored, the replication target message delivery router 114 can now queue messages to the endpoints equivalent to those on the primary system 100. Messages queued to endpoints in the replication target message delivery router 114 will not be delivered to clients until an activity switch from primary system 100 to secondary 112 has been effected. If the replication target message delivery router 114 queues messages but is unable to deliver them, it will eventually run out of resources. Leading to a third difference, subscribing clients must acknowledge the receipt of a message to the primary system 100 once all the copies of a message have been delivered and acknowledge by subscribing clients, the active message delivery router 101 can delete the message, freeing resources. The active message delivery router 101 will also forward the acknowledgements on to the replication target message delivery router 114 so that it may also delete the copy of the message that the acknowledgement is referencing. These and other differences between the primary 100 and secondary 112 systems will be discussed in detail in subsequent sections.

Figure 2:
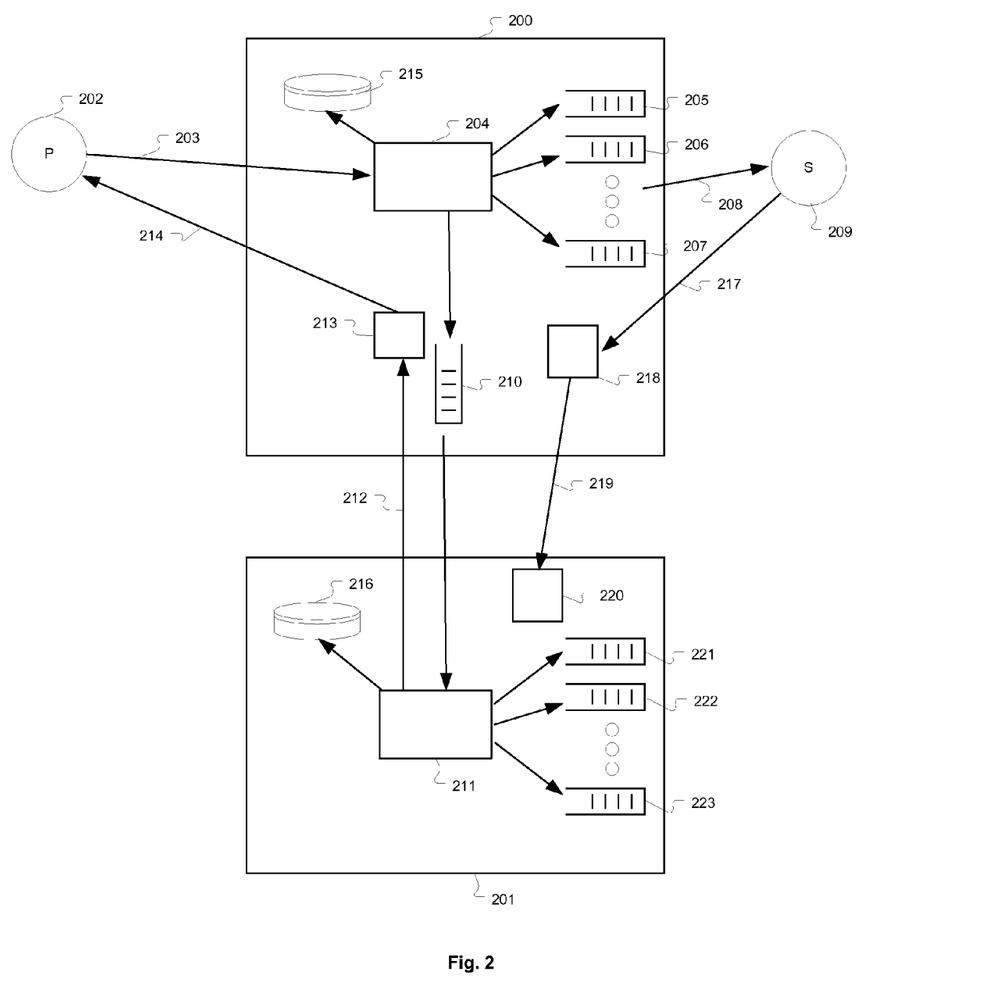
FIG. 2 shows a block diagram of primary and secondary systems detailing critical internal components.

FIG. 2 is a diagram showing the internal processes of a primary system 200 and a secondary system 201. In this instance the primary system 200 is shown as a single active message delivery router rather than an active/standby pair as show in FIG. 1. The secondary system 201 is also shown as a single replication target message delivery router. The system depicted in FIG. 2 also shows publishing client 202 and subscribing client 209. The publishing client 202 generates and sends a message to the primary system 200 shown as flow 203. The message is processed by the router core 204. It is the job of the router core 204 to place the message in non-volatile storage 215 and to match the message either by topic or content to interests gathered from subscribing client(s) 209 and place copies of the message in to queues 205-207 that have an associated matching interest. Note that it is an implementation detail immaterial to the present invention whether the router core 204 chooses to store the message once and place references to the stored copy into queues 205-207 or to place individual copies of the message into queues 205-207. It is also the responsibility of the router core 204 to determine if the message needs to be replicated and placed in the queue 210 to the secondary system 201. If the message is to be replicated then the primary system 200 will be required to forward acknowledgement of receipt notifications (also referred to as subscriber acknowledgements or subscriber acks) that it receives from subscriber(s) 209 to the secondary system 201. A note of which subscriber acks need to be forwarded needs to be made at this time so it can be referenced when the acknowledgement(s) is received.

The receipt of the message sent by the publishing client 202 must be acknowledged by the primary system 200 this is show as flow 214 (also known as a publisher acknowledgement or publisher ack). The determination of when to acknowledge the publisher 202 is made depending on the type of type of replication service that is provided. If the router core 204 determines that the message does not require replication or it requires asynchronous replication then the publisher acknowledgement can be sent as soon as the message is successfully placed in non-volatile storage 215. If the router core 204 determines that the message must be replicated using synchronous replication then the publisher acknowledgement 214 cannot be sent until the secondary system 201 has successfully received a replicate of the message and returned an acknowledgement 212 stating that it received the replicate and placed it in its own non-volatile storage 216. Processor 213 receives the acknowledgements from the secondary system 201 and removes acknowledged messages from queue 210. Processor 213 also waits to send the publisher ack to publisher 202 for messages that were synchronously replicated until it receives an acknowledgement 212 for the message from the secondary system 201. The secondary system 201 receives replicated messages from the primary system 200 out of queue 210. The router core 211 of the secondary system 201 processes replicated messages from the primary system 200 as the router core 204 of the primary system 200 processes messages from publishing clients 202. The router core 211 of the secondary system 201 will match the topic or content of replicated messages to interests that have been mirrored (via previously described configuration mirroring process) from the primary system 200 and copies of the messages are placed into queues 221-223 that correspond to queues 205-207 for which matching interests were detected. The router core 211 of the secondary system 201 must also place the message in to non-volatile storage 216. Once the message has been successfully placed in non-volatile storage 216, the secondary system 201 can send an acknowledgement 212 back to the primary system 200.

The primary system 200 delivers messages to subscribing client(s) 209 from queues 205-207. Each subscribing client 209 receives an individualized stream of messages 208 depending on the interests that it has registered with the router core 204 and its ability (or willingness) to receive messages. After receiving a message a subscribing client 209 must send a subscriber ack 217 back to the primary system 200 acknowledging that it successfully received the message. The primary system 200 processes the subscriber acknowledgements in block 218 as follows; first it will remove the copy of the message from the queue 205-207 that the subscribing client 209 received it from. Second it will determine if the message was replicated and a copy of the subscriber acknowledgement 217 must be forwarded on to the secondary system 219. If a copy of the subscriber acknowledgement is forwarded (shown as flow 219) to the secondary system 201, processor 220 will examine the acknowledgement and remove the corresponding copy of the message from its queue 221-223.

Figure 3:
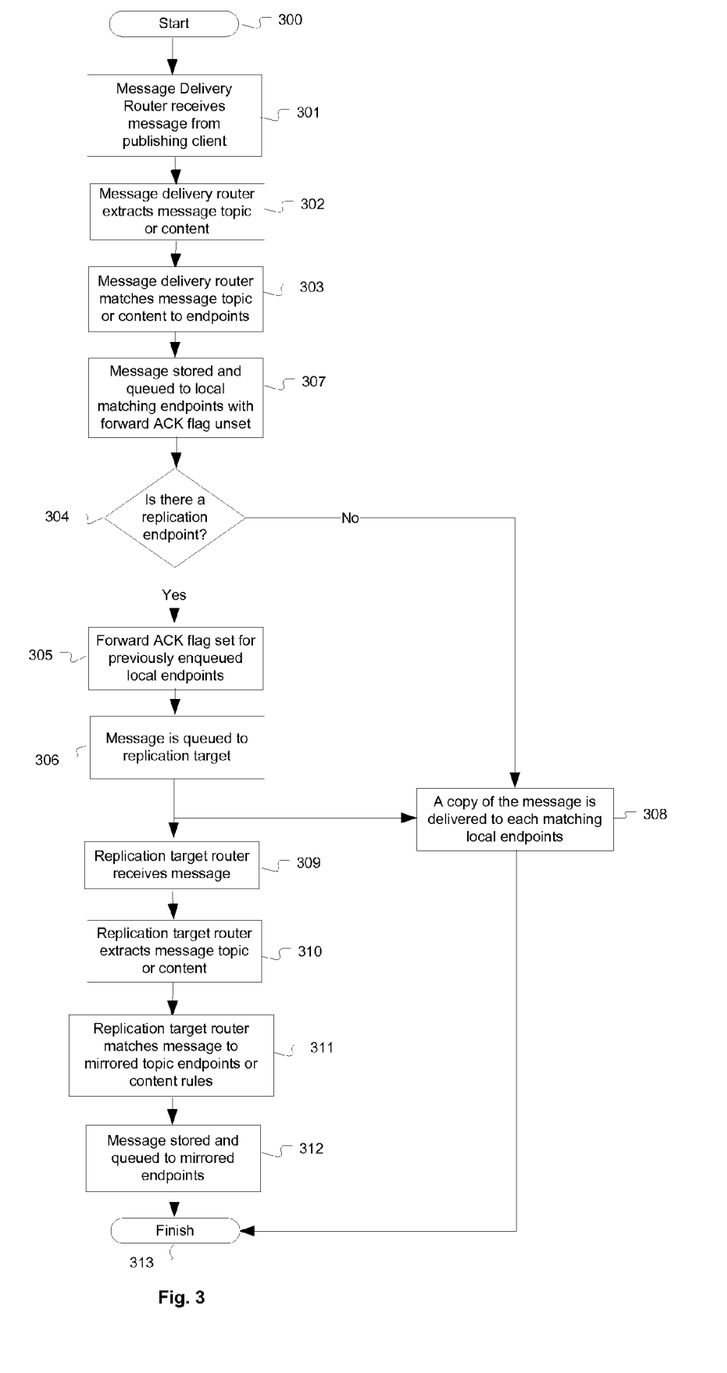
FIG. 3 shows a flow chart that details the processing performed by primary and secondary systems in response to a message generated by a client.
Figure 4:
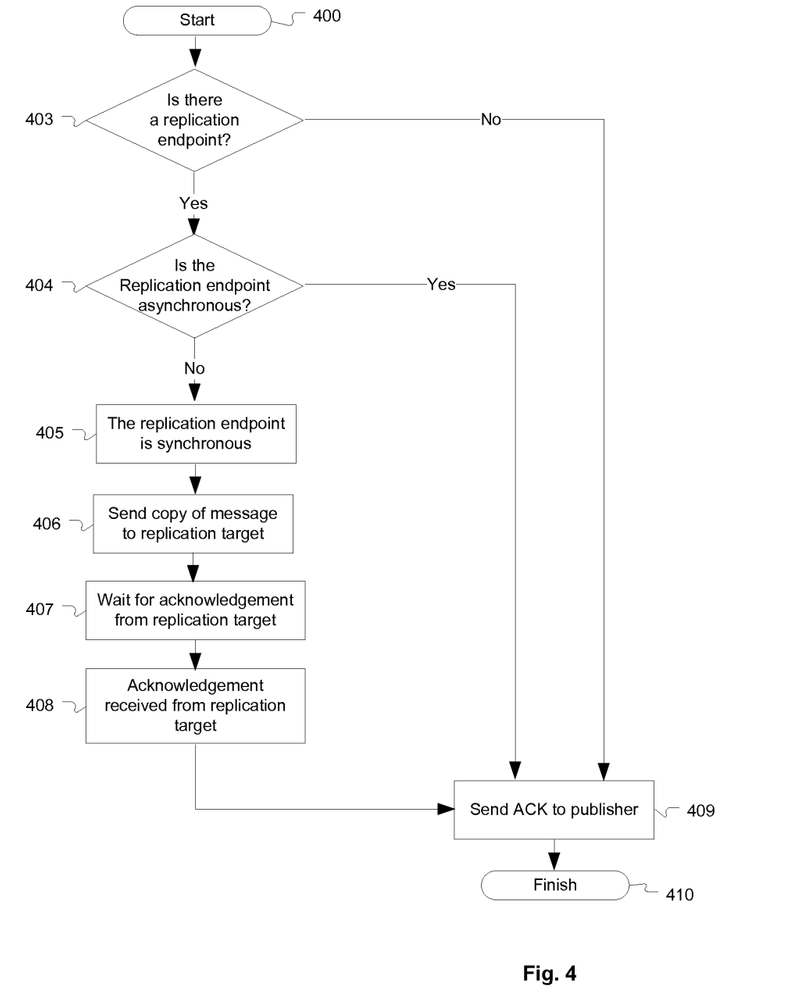
FIG. 4 shows a flow chart that details the processing performed to return an acknowledgement of receipt to a publishing client.
Figure 5:
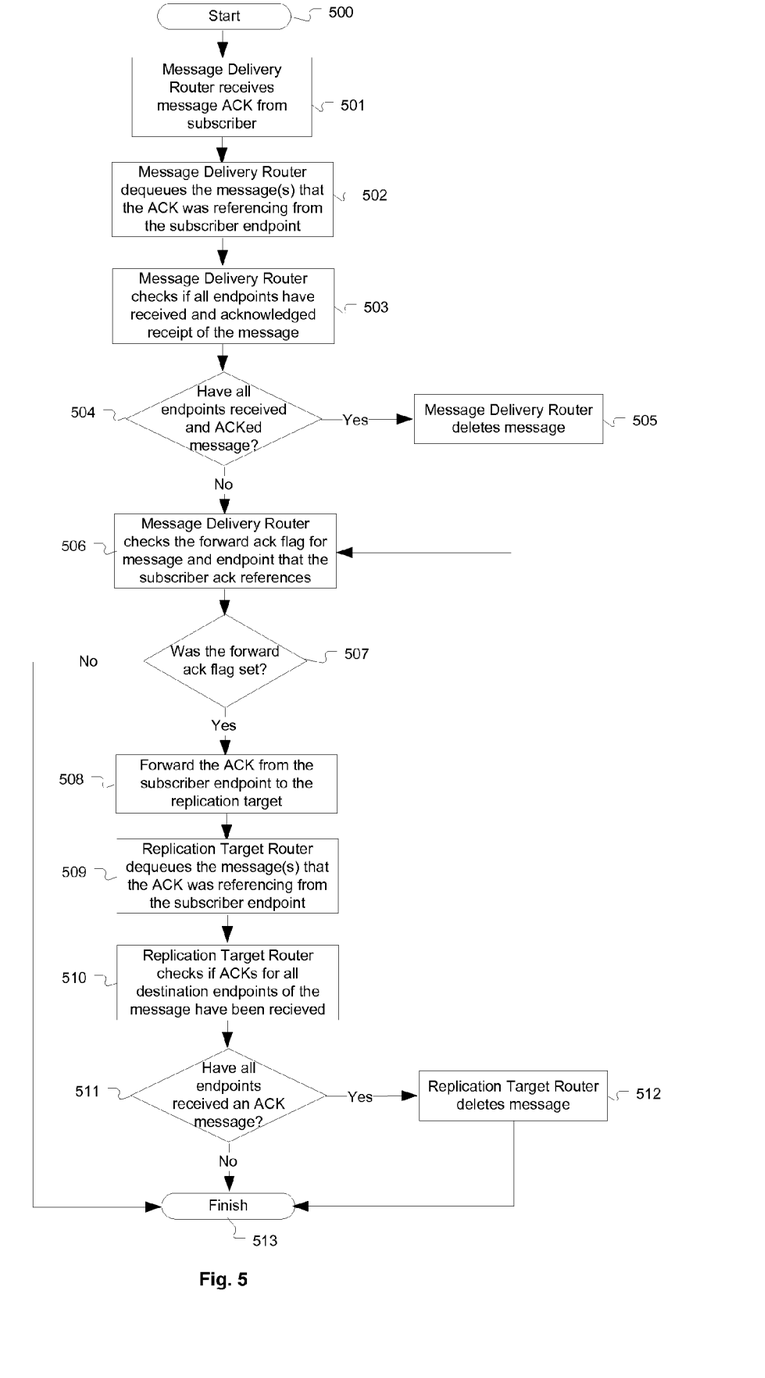
FIG. 5 shows a flow chart that details the processing performed by the primary and secondary systems in response to receiving an acknowledgement of receipt from a subscribing client.

The processing steps shown in FIG. 2 will be detailed by FIGS. 3, 4 and 5 in which FIG. 3 is a flow chart describing processing performed in the router core 204, 211 of the primary 200 and secondary 201 systems. Processing on the primary system begins at step 300 when the message delivery router receives a message from a publishing client at step 301. The message delivery router extracts the topic or content that will be used to match the message to interests from subscribers and to determine if the message is to be replicated in step 302. The process of matching is performed at step 303 and a copy of the message is placed in local non-volatile store and queued to all local endpoints at step 307. As will be described it may be necessary for the primary message delivery router to forward acknowledgements received from subscribing clients to the replication target message delivery router. A forward ack flag is used to keep track of which acknowledgements need to be forwarded. At step 307 the forward ack flag is set to do not forward for each local endpoint to which a copy of the message is queued. At step 304 the results of the matching process are checked for the existence of a match to an interest associated with a replication endpoint. A replication endpoint is similar to a subscriber endpoint in that it is a destination to which a copy of the message must be sent but, different because it is the secondary system, another message delivery router configured to be a replication target. Note that there are other possible mechanisms that could be employed within the scope of the present invention to determine if a message needs to be replicated or not. For example the publishing client could indicate that a message is to be replicated based on the status of a flag in the message header or there could be attributes associated with matching endpoints that indicate a need to replicate messages sent to that endpoint. If there is a replication endpoint present proceed to step 305 where the forward ack flag is set to forward for each of the local endpoints to which the message was queued in step 307. At this time the message delivery router should also take note of the type of replication that the message is to undergo, synchronous or asynchronous as it would typically be an attribute associated with the interest that matched the replication endpoint and affects how the publisher acknowledgement will be sent (to be described in a subsequent section). In step 306 a copy of the message is placed in the queue for the replication target message delivery router. If the test in step 304 does not yield a replication endpoint then proceed to step 308. In step 308 the message delivery router can begin delivering copies of the message queued to endpoints that are ready and willing to receive them; if it is determined at step 304 that there is a replication target endpoint then this process can begin after step 306.

In the previous section the processing performed when a message is received from a publishing client by the primary message delivery router was described. FIG. 3 further describes the processing of the replicated copy of the message that must be carried out by the replication target. In step 309 the replication target receives a copy of the message from the primary message delivery router. In processing similar to that which occurred on the primary system in step 302, the replication target extracts the message topic or content that will be used in the matching process at step 310. In step 311 the message topic or content is matched to the interests of endpoints that were previously mirrored to the replication target from the primary. The resulting matches from step 311 should be identical to the local endpoints matched on the primary message delivery router in step 303. In an alternate implementation the local matching endpoints on the primary message deliver router from step 303 could be sent to the replication target along with the message in step 306. This would relieve the replication target of the task of performing the matching itself. In step 312 a copy of the message is placed in queue to the matching endpoints and the message is stored in local non-volatile storage. Note that the messages will not be delivered by the replication target until an activity switch is effected and the replication target becomes the active message delivery router.

There is another possible alternate implementation in which the decision whether or not to replicate a message is determined based on the requirements of the subscribing clients for which a matching interest was found. In the alternate implementation the decision to replicate a message is based on the results of a lookup of a replication behavior attribute for each subscriber endpoint for which a matching interest was detected. The state of the attribute can be synchronous replication, asynchronous replication or no replication. If the attribute for any of the matching subscriber endpoints is set to either synchronous or asynchronous replication then a copy of the message must be placed in queue to the replication target message delivery router. Different subscriber endpoints may receive different replication treatments however, if any of the matching endpoints have the replication attribute set to synchronous then the publisher must receive the synchronous acknowledgement treatment as will be described. Also in the alternate implementation the forward ack flag indicating whether or not the subscriber acknowledgement is to be forwarded to the replication target must be set to forward for any matching endpoint that had its replication attribute set to synchronous or asynchronous replication. In the alternate implementation an additional check of the replication behavior attribute is performed on the replication target message delivery router for each endpoint that has registered an interest that matches the message to determine which endpoints to queue a copy of the message to. On the replication target message delivery router a copy of the message will only be queued to endpoints with a matching interest that had the replication behavior attribute set to synchronous or asynchronous replication.

Of messages that are to be replicated there are two possible treatments which they may receive; synchronous or asynchronous. The difference between the two treatments is in when the acknowledgement 214 is sent back to the publishing client 202. The message delivery router 200 will not send the acknowledgement 214 to the publisher 202 for messages that are synchronously replicated until the message has been received and stored by the replication target message delivery router 201. This results in a long round trip time from the publishing client 202 generating a message 203 to the message delivery router 200 returning a publisher acknowledgement 214 for the message 203. Long round trip times result in low throughput for publishing clients that are using blocking send calls. The round trip time can be reduced by using asynchronous replication in which case the message delivery router 200 is able to return an acknowledgement 214 to the publisher 202 as soon as it has placed the message 203 in its local storage 215. In fact the performance of asynchronous replication is almost identical to that of no replication. The cost of doing asynchronous replication is that there may be message loss during an activity switch. For example if the primary system 200 was to fail after the acknowledgement 214 was returned to the publisher 202 but before a copy of the message 203 was sent to the replication target 201 the message would be lost once the replication target 201 became active.

FIG. 4 is a flow chart depicting the processing steps that the primary system must perform in order to send an acknowledgement of receipt to a publisher (also known as a publisher acknowledgement or publisher ack). Processing of publisher acknowledgements starts at step 400 after the message has been locally stored and the matching process has been completed as previously described. Step 403 is a check for the presence of a replication endpoint. Stated another way, step 403 is a check to see if a copy of the message was queued to the replication target message delivery router as a part of the processing described in FIG. 3. If there was no copy of the message queued to the replication target message delivery router then the acknowledgement can be immediately sent to publisher in step 409. If there was a copy of the message queued to the replication target message delivery router proceed to step 404 where a test is performed to see if the copy of the message queued was to receive the asynchronous replication treatment. If the message queued to the replication target message delivery router was to receive the asynchronous treatment then the acknowledgement can be immediately sent to the publisher in step 409. Note that the publisher acknowledgement processing is identical for the case where the message is not replicated and where it is asynchronously replicated. Step 405 begins the processing if the message was to be synchronously replicated. In the synchronous replication case the publisher acknowledgement cannot be sent until the replication target message delivery router has received and stored the message. In step 406 a copy of the message is sent to the replication target message delivery router, if there are any previously sent messages in the queue they must be sent first. The replication target message delivery router must store the message in its local non-volatile storage before it can send its own acknowledgement back to the primary system. In step 407 the primary system waits for the replication target to acknowledge that it has received and stored the message. Once the acknowledgement from the replication target has been received in step 408 the publisher acknowledgement can be sent in step 409.

The techniques described in FIG. 4 provide some significant advantages compared to prior art methods that use storage features as the replication mechanism. Storage systems at their core read and write blocks of data to disk (or arrays of disks); they are unaware of what is stored in the blocks. For example when a message is written to disk by a write call to the file system resulting in a number of storage blocks being written, the storage system is unable to tell which of those blocks contain the message data and which carry other data that may be required by the file system. If the storage is synchronously replicating these blocks to storage that is a part of the secondary system then each block must be transferred and acknowledged before the next block can be written resulting in low message throughput. Furthermore whether or not to synchronously replicate the storage blocks is a mode of the storage and if there are any message flows system wide that must be replicated synchronously then all message flows that must be placed in storage will suffer the performance impacts. Using the methods of the present invention, each system (primary and secondary) manages its own storage and the two systems are aware of the boundaries between messages. This allows the secondary system to acknowledge messages as opposed to synchronously acknowledging every block (without knowledge of where the message boundaries are). The primary system may also stream messages to the secondary; it does not need to wait for the secondary system to acknowledge previous messages before it can send the next. This increases throughput and allows the primary message delivery router to proceed in processing messages from other clients while waiting for the secondary system to return an acknowledgement for a previously sent message. In prior art methods it is the act of writing the message to the storage system that triggers the replication of the message. In a persistent messaging system the messages must be placed in non-volatile storage; if each storage block write needs to be synchronously replicated and transferred to a remote storage system it will stall subsequent storage operations. Using the techniques of the present invention the message is locally stored which is a relatively inexpensive operation allowing client delivery to proceed quickly and in parallel with replication of the message. The present invention allows asynchronous and synchronous replication to co-exist; as shown in FIG. 3 the only difference between the synchronous and asynchronous replication is when the publisher acknowledgement is sent. In prior art methods if any messages in the system are to receive the synchronous treatment then the storage system must be put into synchronous mode and as a result all messages receive the synchronous treatment.

The techniques of the present invention offer another advantage in the case where connectivity between the primary and secondary systems is lost or where the secondary system becomes congested and is slow to return acknowledgements. If any of these conditions are detected then using the techniques of the present invention messages that are to be synchronously replicated can temporarily be converted to asynchronously replicated. This will allow an acknowledgement to be sent to the publisher so that the publishing client can make forward progress during the time that the secondary system is offline or until it is able to clear the congestion.

FIG. 5 is a flow chart describing the processing that must be performed when an acknowledgement of receipt is received from a subscribing client. An acknowledgement of receipt from a subscriber also known as a subscriber acknowledgement (or subscriber ack) references a particular message and destination endpoint or queue. As previously described a message may be queued to multiple destinations and the message delivery router must receive an acknowledgement for each message from each destination. Starting at step 500, in step 501 the primary system receives an acknowledgement of receipt for a copy of a message that was sent to a subscribing client. Since the subscriber is acknowledging that it has safely received a copy of the message, which can now be removed from the queue that the acknowledgement references in step 502. In step 503 the message delivery router checks to see if copies of the message been successfully delivered to all matched subscriber and replication endpoints. If all of the outstanding acknowledgements have been received at step 504 then the message delivery router can safely delete the message from its non-volatile storage in step 505. The main processing flow continues at step 506 in which the primary message delivery router checks to see if the acknowledgement needs to be forwarded to the replication target. In the processing steps described in FIG. 3 the forward ack flag was set to forward for each endpoint if a replication target endpoint was matched. The state of the forward ack flag is checked in step 507. If the forward ack flag was set to do not forward then processing completes at step 513. In step 508 the subscriber acknowledgement is forwarded to the replication target. The replication target removes the copy of the message from the queue that the acknowledgement is referencing in step 509. In the case that the secondary system becomes active the replication target message delivery router will not be required to send this message to a subscribing client that connects to the endpoint that the acknowledgement references since the acknowledgement is indicating that the message was successfully received by the subscribing client connected to the primary system. In step 510 the replication target message delivery router checks to see if there are any remaining copies of the message that the acknowledgement references queued to other endpoints. Put another way the replication target message delivery router checks to see if it has received all of the subscriber acks that it is expecting for the message. If all the acknowledgements for the message have been received at step 511 then the replication target message delivery router can remove the message from its local non-volatile storage in step 512.

In the previously described situation where the secondary system is offline or congested many messages may accumulate in the queue 210 to the secondary system 201. If the primary system 200 receives all of the subscriber acknowledgements 217 for a message while it is still in queue 210 to the secondary system 201 then the primary system 200 can remove the message from the queue 210 to the secondary system 201. This will help to relieve congestion in the queue 210 to the secondary system 201 and will also help the secondary system to catch up when it comes back online because there will be less events that it needs to process in order to catch back up. In the previously described alternate implementation where the results of the matching process are transferred along with the message to the replication target message delivery router, if the primary system receives a subscriber acknowledgement 217 before the message is transferred to the replication target then the destination which the acknowledgement is referencing may be removed from the list of matching interests that is to be transferred with the message. In this case the subscriber acknowledgement can be discarded as there is no longer a need to forward it to the replication target. Similar to the previously described implementation if all the subscriber acknowledgements for a particular message have been received while it is still in queue 210 to the replication target message delivery router 201 then the message may be removed from the queue. In the alternate implementation this condition can be detected by the fact that there will be no matching interests left in the list that is to be transferred to the replication target 201 along with the message.

Figure 6:
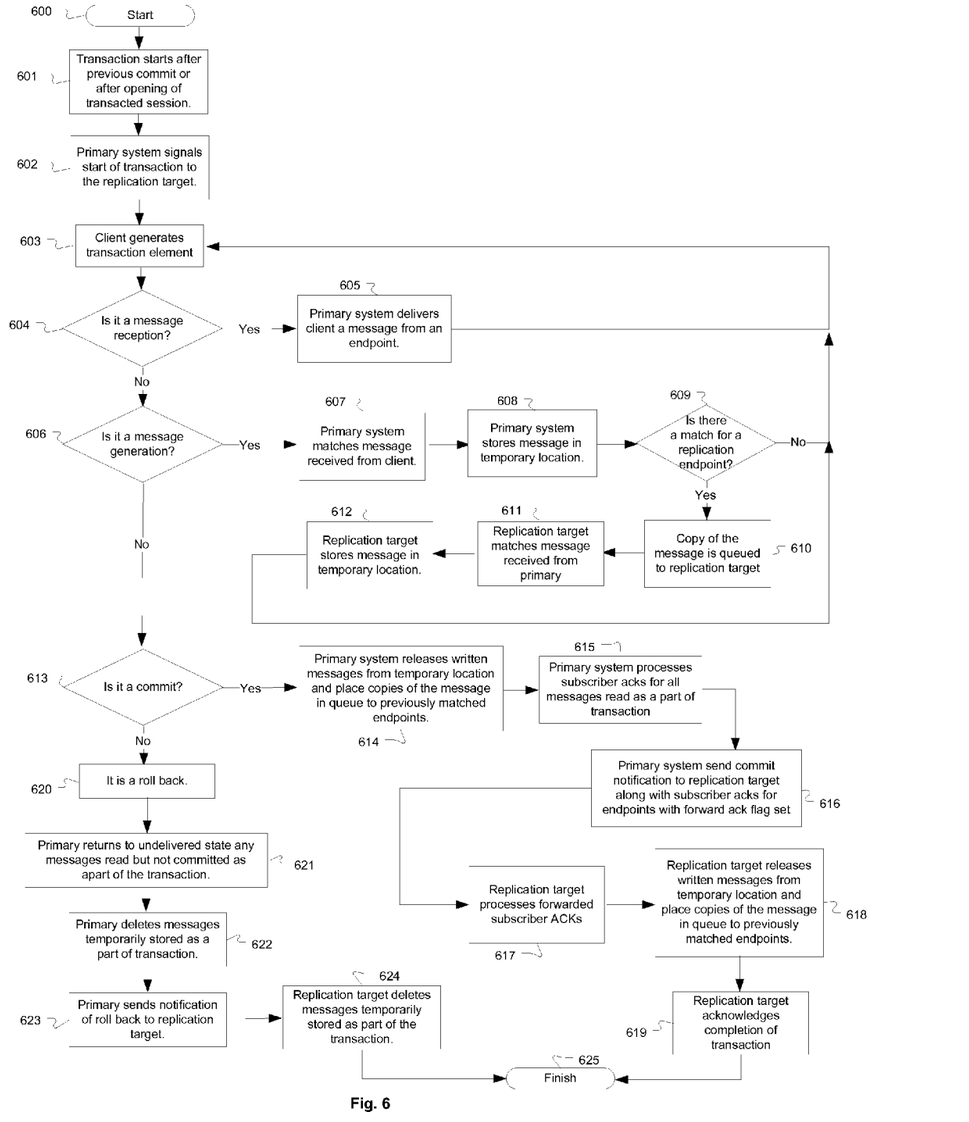
FIG. 6 shows a flow chart that details the processing performed by the primary and secondary systems for transacted client sessions.

Previously discussed assured messaging semantics have been either what is known in the art as publish/subscribe or queue based. There is another assured messaging semantic known in the art as transaction based. In transactional messaging a series of messages are bundled as a group (or transaction). From the point of view of a messaging system client the elements (or operations) that compose the transaction can be either message reception, message generation or a termination of the transaction. When the client has completed all of the message generation and reception elements of the transaction it can terminate it either by committing the transaction or rolling it back. The key point is that all of the elements composing a single transaction are either completed as a unit or rolled back (or undone). It is not possible for a transaction to be partly completed. If a transaction is rolled back then any messages read as a part of it are returned to the undelivered state and any messages generated as a part of the transaction are deleted before they are delivered to any client endpoints. FIG. 6 is a flow chart that describes how the present invention provides replication of transactional messages.

FIG. 6 shows the steps followed in the processing of a transactional message. Step 601 is the start of processing of a transaction, this could be explicitly signaled by the client in the form of a start of transaction message or in the case of the Java Messaging System (JMS) application programming interface (API) the start of a transaction is implicitly indicated at the start of the session or when the previous transaction was completed. In step 602 the primary system sends a start of transaction notification to the replication target system. The start of transaction notification indicates to the replication target that it must be ready to temporarily store messages that may be arriving as a part of this transaction until it is completed (committed or rolled back). In step 603 the first element of the transaction is generated. A transaction element could be the reception of a message, the generation of a message or a completion of the transaction (either by commit or roll back). At step 604 the transaction element is tested to see if it is a reception of a message. If the element is a message reception, proceed to step 605 where the message is transferred to the client from the primary system. As will be described, the replication target will only receive notification that the message was delivered to the client when it receives a subscriber ack that is included in the commit notification of the transaction. From step 605 proceed back to step 603 to process the next element. If the next element of the transaction is a message generation, tested at step 606 then proceed to step 607. The client generates a message and sends it to the primary system where the matching process is completed at step 607. Once the message has been matched it is placed in non-volatile storage by the primary system in step 608. Note that the message is held in a temporary (non-volatile) transaction buffer and is not placed in queue to the destinations matched in step 607; this will be done when the transaction is committed. In step 609 the results of the matching performed in step 607 are tested for the presence of a replication endpoint. If the message does not need to be replicated then proceed to step 603. If the message needs to be replicated then proceed to step 610 where a copy of the message is transferred to the replication target system. Also at step 610 the primary system must note whether or not the message is to be receive the synchronous or asynchronous replication treatment. Methods for determining the type of replication treatment the message is to receive is the same as for non transactional messaging. However, it should be noted that a single transaction could involve the generation of multiple messages which could have different replication treatments. In a transaction the acknowledgement that is returned to the publisher in response to the commit of the transaction is the publisher acknowledgement that is of main concern. If any messages that were generated as a part of a particular transaction are to receive the synchronous treatment then the publisher acknowledgement sent in response to the commitment of the transaction should receive the synchronous treatment. That is the primary system will not send to the publisher an acknowledgement of the commitment of the transaction until it has received an acknowledgement from the replication target system that the commitment message(s) have been processed. In step 611 the replication target system receives the copy of the message from the primary system and proceeds to match it as the primary system did in step 607. In step 612 the replication target system places the message into its local non-volatile storage into a temporary transaction buffer. Once the message has been stored by the replication target proceed back to step 603 where the next transaction element is generated. Note that since the primary and replication target systems are separate entities it is possible that the primary system could have proceeded to process the next element in advance of the replication target completing its processing in step 612. If the next element of the transaction is a commit as tested for in step 613 then proceed to step 614. A commit message sent by a client indicates that the messages stored in the transaction buffer can be placed in queue to the endpoints previously matched in step 607; the commit also contains the subscriber acknowledgements for any messages that the client received as a part of the transaction. In step 615 the primary system processes all of the subscriber acknowledgements that were received as a part of the commit notification. The processing of the subscriber acks is similar to processing a subscriber acknowledgement for any message outside of a transaction. In processing the subscriber acks contained in the commit notification the primary system checks the forward ack flag for each subscriber acknowledgement and includes those with the flag set to forward in the commit notification that will be sent to the replication target in step 616. In step 617 the replication target receives the commit notification from the primary system with the subscriber acknowledgements for messages that were previously replicated (when they were generated) and acknowledged with the commitment of the transaction. The subscriber acks are processed by the replication target and in step 618 the replication target places in queue the previously generated messages stored in the temporary transaction buffer. The messages are placed in queue to the endpoints previously matched in step 611. The replication target sends an acknowledgement back to the primary system in step 619. The acknowledgement process is similar to the generation of a publisher acknowledgement as previously described for the generation of a non-transactional message. As previously noted whether or not the primary system holds the acknowledgement of the transaction commitment to be sent back to the client until it receives the acknowledgement from the replication target depends on the replication treatment that the individual messages generated as a part of the transaction were to receive. If any of the messages generated were to receive the synchronous replication treatment then the primary system will hold the acknowledgement of commitment until it receives an acknowledgement from the replication target that it completed processing of the commit notification. If the transaction is to be rolled back in step 620, then any messages received by the client as a part of the transaction will be returned to the undelivered state by the primary system in step 621. Any messages stored in the transaction buffer will be discarded by the primary system in step 622. In step 623 the primary system sends a notification to the replication target that the transaction is to be rolled back and the replication target deletes the messages stored in its transaction buffer as a part of the transaction in step 624. Note that if an activity switch from the primary system to the replication target is effected then any partially completed transactions will be automatically rolled back.

Those skilled in the art will see that there is a possible alternate implementation of transactional messaging with replication to the one presented in FIG. 6. In the alternate implementation the primary system stores the entire transaction in its temporary non-volatile transaction buffer until the transaction is committed at which point all messages generated and acknowledgements for messages consumed as a part of the transaction are transferred as a single operation to the replication target system. The alternate implementation has the advantage that is simpler to implement than the implementation described in FIG. 6. For example if the transaction is rolled back, the replication target does not need to be notified; the primary system can simply discard any messages generated as a part of the transaction and return to the undelivered state any messages read. The disadvantage of the alternate implementation is that if the transaction contains many messages it may take a long time to process the commitment of the transaction because of the time required to transfer a copy of all the messages that comprise the transaction to the replication target system. If the transaction is to receive synchronous publisher acknowledgements it may take a relatively long time for the primary system to return a publisher acknowledgement to the publisher. This can lead to unpredictable performance.

All references mentioned above are herein incorporated by reference.

We claim:

1. An assured message delivery system within a data communication network with resiliency for receiving messages from publishing client(s) and delivering the messages to subscribing clients with indicated interests matching the messages, comprising:
   (a) a primary message delivery system for delivering the messages to the subscribing clients during normal operation, said primary message delivery system comprising:
      (i) a plurality of first message queues, said first message queues being associated with the subscribing clients based on indicated interests;
      (ii) a first non-volatile data store;
      (iii) an additional message queue for storing replicate messages; and
      (iv) at least one delivery router processing individual messages received from the publishing client(s) for identifying the subscribing clients having indicated interests matching the individual messages received from the publishing client(s) and placing the individual messages into said first non-volatile data store, and into said first message queues based on the identified subscribing clients for delivery of the individual messages to said identified subscribing clients, and placing replicates of said individual messages in said additional message queue;

(b) a communications link in communication with said additional message queue; and (c) a secondary message delivery system mirroring the configuration of the primary message delivery system, said secondary message delivery system comprising:
  (i) a second non-volatile data store;
  (ii) a plurality of second message queues being associated with the subscribing clients based on indicated interests, said second message queues mirroring said first message queues;
  (iii) a replication target message delivery router receiving said replicates of said individual messages over said communications link from said additional message queue, said replication target message delivery router processing said replicates of said individual messages as said replicates of said individual messages are received from said additional message queue to place said replicates of said individual messages in said second non-volatile data store and in said second message queues mirroring said first message queues based on the identified subscribing clients, wherein said second messages queues correspond to said first message queues; and said secondary message delivery system being configured to send acknowledgement messages back to the primary message delivery system when said replicates of said individual messages have been placed in said second non-volatile data store and upon activation to send said replicates of said individual messages seamlessly from said second message queues to said subscribing clients;

wherein the primary message delivery system is configured to forward acknowledgements received from the subscribing clients to the secondary message delivery system, and the secondary message delivery system is configured to delete a replicate message corresponding to a message in the primary message delivery system for which message in the primary message delivery system an acknowledgement has been received from the subscribing clients;

wherein the primary message delivery system is configured to determine whether an unacknowledged message requires replication, and if so whether said unacknowledged message requires synchronous or asynchronous replication, and if said unacknowledged message requires no replication or asynchronous replication the primary message delivery system is configured to send an acknowledgment back to the publishing client as soon as said unacknowledged message is placed in said first non-volatile data store, and if said unacknowledged message requires synchronous replication, the primary message delivery system is configured to send an acknowledgement back to the publishing client when an acknowledgment has been received from the secondary message delivery system indicating the secondary message delivery system has successfully stored said unacknowledged message in said second non-volatile data store;

wherein if the primary message delivery system determines the secondary message delivery system has become congested, messages requiring synchronous replication in the second message queues are converted to messages requiring only asynchronous replication; and wherein if said additional message queue becomes congested, any unacknowledged messages are removed from said additional message queue once said unacknowledged messages have been delivered by the primary message delivery system.

2. An assured message delivery system as claimed in claim 1, wherein a communications and activatable link is provisioned between the publishing clients(s) and the secondary message delivery system, whereby in the event of the secondary message delivery system taking over delivery of the messages the activatable link is activated, and the publishing client(s) communicate directly with the secondary message delivery system.

3. A method of providing resiliency in an assured message delivery system within a data communication network for receiving messages from publishing client(s) and delivering the messages to subscribing clients with indicated interests matching the messages, comprising:

a) provisioning a primary message delivery system for delivering the messages during normal operation, said primary message delivery system comprising:
  (i) a plurality of first message queues, said first message queues being associated the subscribing clients based on indicated interests;
  (ii) a first non-volatile data store;
  (iii) an additional message queue for storing replicate messages; and
  (iv) at least one delivery router processing individual messages received from the publishing client(s) for identifying subscribing clients having interests matching the messages received from the publishing client(s) and placing the individual messages into said first non-volatile data store, and into said first message queues based on the identified subscribing clients for delivery of the individual messages to said identified subscribing clients, and placing replicates of said individual messages in said additional message queue;

b) provisioning a communication link in communication with said additional message queue;

c) provisioning a secondary message delivery system to mirror the configuration of the primary message delivery system, said secondary message delivery system comprising:
  (i) a second non-volatile data store;
  (ii) a plurality of second message queues being associated with the subscribing clients based on indicated interests, said second message queues mirroring said first message queues;
  (iii) a replication target message delivery router receiving said replicates of said individual messages over said communications link from said additional message queue, said replication target message delivery router processing said replicates of said individual messages as said replicates of said individual messages are received from said additional message queue to place said replicates of said individual messages in said second non-volatile data store and in said second message queues mirroring said first message queues based on the identified subscribing clients, wherein said second messages queues correspond to said first message queues; and said secondary message delivery system sending acknowledgement messages back to the primary message delivery system when said replicates of said individual messages have been placed in said second non-volatile data store, and upon activation sending said replicates of said individual messages seamlessly from said second message queues to said subscribing clients;

wherein the primary message delivery system forwards acknowledgements received from the subscribing clients to the secondary message delivery system, and the secondary message delivery system deletes a replicate message corresponding to a message in the primary message delivery system for which message in the primary message delivery system an acknowledgement has been received from the subscribing clients;

wherein the primary message delivery system determines whether an unacknowledged message requires replication, and if so whether said unacknowledged message requires synchronous or asynchronous replication, and if said unacknowledged message requires no replication or asynchronous replication the primary message delivery system sends an acknowledgment back to the publishing client as soon as said unacknowledged message is placed in said first non-volatile data store, and if said unacknowledged message requires synchronous replication, the primary message delivery system sends an acknowledgement back to the publishing client when an acknowledgment has been received from the secondary message delivery system indicating the secondary message delivery system has successfully replicated said unacknowledged message;

wherein if said secondary message delivery system becomes congested, messages requiring synchronous replication are converted to messages requiring only asynchronous replication; and wherein if said additional message queue becomes congested, any unacknowledged messages are removed from said additional message queue once said unacknowledged messages have been delivered by the primary message delivery system.

4. A method as claimed in claim 3, further comprising activating a communications link between the publishing clients(s) and the secondary message delivery system in the event of the secondary message delivery system taking over delivery of the messages whereby the publishing client(s) communicate directly with the secondary system.

\* \* \* \* \*